UNITED STATES PATENT OFFICE.

ROBERT LEE WEATHERFORD, OF FORT WORTH, TEXAS.

COMPOSITION OF MATTER TO BE USED FOR THE WELDING AND SOLDERING OF DIFFERENT ARTICLES CONSTRUCTED OF ALUMINUM ONLY.

1,194,101.   Specification of Letters Patent.   Patented Aug. 8, 1916.

No Drawing.   Application filed May 22, 1916. Serial No. 99,090.

*To all whom it may concern:*

Be it known that I, ROBERT LEE WEATHERFORD, a citizen of the United States, residing at Fort Worth, in the county of Tarrant and State of Texas, have invented a new and useful Composition of Matter to be Used for the Welding and Soldering of Different Articles Constructed of Aluminum Only.

My composition consists of the following ingredients, combined in the proportions stated, viz:

Aluminum _____ 1 part.
    Lead _____ 1 part.
    Block tin_____ 2 parts.
    Zinc _____ 2 parts.
    Commercial bismuth_____ 1 part.
    Antimony _____ 1 part.

These ingredients are to be thoroughly mingled after being heated to a heat of seven or eight hundred degrees Fahrenheit, at which heat the ingredients melt, by agitation. The different ingredients after being melted and thoroughly mingled by agitation and while still in the melted form is treated five times with sulfuric acid of strength sixty-six per cent. pure, the acid being poured into the composition to purify the same; the acid after evaporation leaves the dirt and sediment in the composition floating on the surface, which dirt and sediment is skimmed leaving the composition pure and clean and ready to be poured into molds or forms to suit the manufacturer. The quantity of sulfuric acid used in the cleansing process each time is two parts relative to the amount of alloy. The use of the sulfuric acid has no effect on the melted condition of the ingredients, as it is used while they are in a molten state, or left on the heat, and only used for cleansing the mixture just before being molded, and the whole not being removed from the heat while undergoing the process of cleansing with the sulfuric acid remains in the liquid condition.

In using the above-named composition the article to be welded or soldered should first be freed from all dirt and obstacles by brushing the ends to be welded or the surface to be soldered with a steel brush. The parts so cleaned are then subjected to heat with an ordinary gasolene blow torch equal to about eight hundred degrees, at which time the said compound is applied under the heat, which causes it to become soft and doughy when it is worked into desired shape to correspond with the ends being welded, after which the work is allowed to cool and is ready for use.

By the use of the above composition the crystallization of aluminum is avoided in the process of welding or soldering as it only requires seven or eight hundred degrees of heat to place it in proper shape for work, whereas under other processes of welding or soldering aluminum by the acetylene process there is required a heat of from twenty-five hundred to thirty-five hundred degrees, which causes crystallization to aluminum and weakens it, as aluminum will only stand about fifteen hundred degrees of heat. The composition has an elasticity and is stronger than aluminum, and it has a flexibility not contained in aluminum articles, and is not injurious to the metal applied to, as it melts at a low temperature.

I claim:

The herein-described composition for welding and soldering articles constructed of aluminum, consisting of aluminum one part, lead one part, block tin two parts, zinc two parts, commercial bismuth one part, and antimony one part, substantially as described.

ROBERT LEE WEATHERFORD.

Witnesses:
  CLARANCE CHARLES WELLS,
  WILLIAM TITTLE.